US012603499B2

(12) United States Patent
Wang et al.

(10) Patent No.: US 12,603,499 B2
(45) Date of Patent: Apr. 14, 2026

(54) ENERGY LINKAGE CHARGING SYSTEMS AND STORAGE MEDIA

(71) Applicant: XCHARGE ENERGY USA INC., Kyle, TX (US)

(72) Inventors: Junshuai Wang, Kyle, TX (US); Rui Ding, Kyle, TX (US)

(73) Assignee: XCHARGE ENERGY USA INC., Kyle, TX (US)

( * ) Notice: Subject to any disclaimer, the term of this patent is extended or adjusted under 35 U.S.C. 154(b) by 18 days.

(21) Appl. No.: 18/772,236

(22) Filed: Jul. 14, 2024

(65) Prior Publication Data

US 2026/0018890 A1 Jan. 15, 2026

(51) Int. Cl.
| | |
|---|---|
| *H02J 3/00* | (2006.01) |
| *B60L 53/302* | (2019.01) |
| *B60L 53/51* | (2019.01) |
| *B60L 53/52* | (2019.01) |
| *B60L 53/60* | (2019.01) |
| *G06N 20/00* | (2019.01) |
| *H02J 3/007* | (2026.01) |
| *H02J 3/32* | (2006.01) |
| *H02J 3/38* | (2006.01) |

(52) U.S. Cl.
CPC ............ *H02J 3/0075* (2020.01); *B60L 53/60* (2019.02); *G06N 20/00* (2019.01); *H02J 3/32* (2013.01); *H02J 3/381* (2013.01); *B60L 53/302* (2019.02); *B60L 53/51* (2019.02); *B60L 53/52* (2019.02); *H02J 2203/20* (2020.01); *H02J 2300/24* (2020.01); *H02J 2300/28* (2020.01)

(58) Field of Classification Search
None
See application file for complete search history.

(56) References Cited

U.S. PATENT DOCUMENTS 9,290,104 B2 3/2016 Gadh et al.
2022/0396167 A1* 12/2022 Sharifipour ............. B60L 53/51
(Continued)

FOREIGN PATENT DOCUMENTS

CN 101826642 B 11/2012
CN 104518563 B 11/2017
(Continued)

*Primary Examiner* — Rexford N Barnie
*Assistant Examiner* — Joel Barnett
(74) *Attorney, Agent, or Firm* — METIS IP LLC

(57) ABSTRACT

A new energy linkage charging system and a storage medium are provided. The system includes a charging interface configured to charge an electrical vehicle with an electrical energy through a converter and a third circuit in response to receiving a charging instruction; a power storage module configured to store the electrical energy and deliver the electrical energy to the charging interface; a power grid charging module and a power generating module configured to deliver the electrical energy to the charging interface and the power storage module; a control module configured to determine a power storage instruction based on power storage module information, and determine the charging instruction and send the charging instruction to the charging interface based on a charging request in response to obtaining the charging request; and an interaction module in communication connection with the control module and configured to obtain the charging request.

11 Claims, 4 Drawing Sheets

(56)     References Cited

U.S. PATENT DOCUMENTS

| | | | | |
|---|---|---|---|---|
| 2023/0120740 A1* | 4/2023 | Lewchuk | .......... | H02J 13/00002 |
| | | | | 320/109 |
| 2023/0170732 A1* | 6/2023 | Cronin | .................... | B60L 53/51 |
| | | | | 320/101 |
| 2023/0361573 A1* | 11/2023 | Bangalore | ............... | H02J 3/381 |
| 2024/0017628 A1* | 1/2024 | Woods | ................. | H02J 7/0042 |
| 2024/0204527 A1* | 6/2024 | Salter | ........................ | H02J 7/35 |
| 2024/0255196 A1* | 8/2024 | Hu | ........................ | H02J 7/0042 |

FOREIGN PATENT DOCUMENTS

| | | | |
|---|---|---|---|
| CN | 107133415 | B | 7/2019 |
| CN | 115296357 | A | 11/2022 |
| EP | 2463138 | B1 | 3/2016 |

\* cited by examiner

<u>100</u>

Power grid charging module
<u>110</u>

Power generating module
<u>120</u>

Power storage module
<u>130</u>

Interaction module
<u>140</u>

Charging interface
<u>150</u>

Control module
<u>160</u>

ENERGY LINKAGE CHARGING SYSTEMS AND STORAGE MEDIA

TECHNICAL FIELD

The present disclosure relates to the field of new energy charging technology, and in particular, to a new energy linkage charging systems and storage media.

BACKGROUND

In the increasingly urgent task of energy conservation and emission reduction, the proportion of new energy vehicles is gradually increasing, and urban transportation, which is dominated by electric vehicles, becomes the future direction of development. Electric vehicles require external power charging, i.e., charging facilities. The charging facilities are susceptible to using a single source of energy for power supply, which may lead to inefficient power supply and higher charging costs.

Therefore, it is desired to provide a new energy linkage charging system and a storage medium, which can comprehensively utilize various energy sources to provide electrical energy for charging electric vehicles to satisfy charging needs of different users.

SUMMARY

One or more embodiments of the present disclosure provide a new energy linkage charging system. The new energy linkage charging system includes a power grid charging module, a power generating module, a power storage module, an interaction module, a charging interface, and a control module. The power grid charging module includes a first circuit connected with a power grid, and the power grid charging module is configured to deliver first electrical energy provided by the power grid to at least one of the charging interface and the power storage module. The power generating module is configured to provide second electrical energy and deliver the second electrical energy to at least one of the charging interface and the power storage module. The power storage module is configured to store at least one of the first electrical energy and the second electrical energy, and deliver the at least one of the first electrical energy and the second electrical energy to the charging interface, wherein the power storage module is in communication connection with the control module; and in response to receiving a power storage instruction, charge a battery of the power storage module via at least one of the power generating module and the power grid charging module. The interaction module is in communication connection with the control module, and the interaction module is configured to obtain a charging request. The charging interface includes a second circuit, a connecting end, a third circuit, and a converter, and the connecting end and the third circuit are connected to an electric vehicle that sends out the charging request. The second circuit is connected with at least one of the power grid charging module, the power generating module, and the power storage module. The converter is configured to regulate at least one of the first electrical energy and the second electrical energy delivered by at least one of the power grid charging module, the power generating module, and the power storage module to a charging current and deliver the charging current to the third circuit. The charging interface is in circuit connection with the power grid charging module, the power generating module, and the power storage module, and the charging interface is in communication connection with the control module. The charging interface is configured to transfer at least one of the first electrical energy and the second electrical energy delivered by at least one of the power grid charging module, the power generating module, and the power storage module to charge the electric vehicle through the converter and the third circuit in response to receiving a charging instruction The control module is configured to determine the power storage instruction based on power storage module information; and in response to obtaining the charging request, determine the charging instruction and send the charging instruction to the charging interface based on the charging request. The charging instruction includes charging by employing at least one of the power grid charging module, the power generating module, and the power storage module.

One or more embodiments of the present disclosure provide a non-transitory computer-readable storage medium storing computer instructions. When a computer reads the computer instructions in the storage medium, the computer performs the new energy linkage charging system.

BRIEF DESCRIPTION OF THE DRAWINGS

The present disclosure is further illustrated in terms of exemplary embodiments. These exemplary embodiments are described in detail with reference to according to the drawings. These embodiments are non-limiting exemplary embodiments, in which like reference numerals represent similar structures, wand wherein.

DETAILED DESCRIPTION

Figure 1:
FIG. 1 is an exemplary diagram illustrating modules of a new energy linkage charging system according to some embodiments of the present disclosure.

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system", "device", "unit" and/or "module" as used herein is a manner used to distinguish different components, elements, parts, sections, or assemblies at different levels. However, if other words serve the same purpose, the words may be replaced by other expressions.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Existing charging stations for charging an electrical vehicle use a power grid as the sole power source to provide electricity, and thus power supply to the charging stations is easily affected. For example, there may be a problem such as an unstable power supply during peak electricity consumption, resulting in a full charge taking longer time. Additionally, the electricity price varies depending on the region where the power grid is located. For example, commercial electricity costs are higher, resulting in higher charging costs.

In view of the above, some embodiments of the present disclosure are expected to provide an improved new energy linkage charging system, which may use a variety of power sources such as a power grid, a power generating module, and a battery for power supply. The power sources may be alternately selected to accommodate different charging needs such as a charging duration, a charging cost, etc.

FIG. 1 is an exemplary diagram illustrating modules of a new energy linkage charging system according to some embodiments of the present disclosure.

As shown in FIG. 1, a new energy linkage charging system 100 may include a power grid charging module 110, a power generating module 120, a power storage module 130, an interaction module 140, a charging interface 150, a control module 160, or the like.

In some embodiments, the power grid charging module 110, the power generating module 120, or the like, may be electrically connected with the power storage module 130, respectively. The power grid charging module 110, the power generating module 120, and the power storage module 130, or the like, may be electrically connected with the charging interface 150, respectively. The interaction module 140 may be in communication connection with an electrical vehicle, the control module 160, or the like, respectively. The control module 160 may be in communication connection with the power grid charging module 110, the power generating module 120, the charging interface 150, or the like, respectively. Other connections may be included between the above modules and the charging interface.

The power grid charging module 110 is configured to output first electrical energy provided by a power grid to other structures. In some embodiments, the power grid charging module 110 may be configured to deliver the first electrical energy to at least one of the power storage module 130, the charging interface 150, or the like. In some embodiments, the power grid charging module 110 may include a first circuit connected with the power grid. In some embodiments, the power grid charging module 110 may include a socket, or the like.

The power grid is a circuit configured to provide the first electrical energy. In some embodiments, the power grid may include a zero wire, a fire wire, or the like.

In some embodiments, the first circuit may include circuit connected in parallel between the zero wire and the fire wire of the power grid. In some embodiments, the power storage module 130 and the charging interface 150 may be connected in parallel and/or in series with the first circuit.

The power generating module 120 is configured to convert other sources of energy to electrical energy, for example, the power generating module 120 may convert at least one of wind energy, light energy, thermal energy, or the like, to electrical energy. In some embodiments, the power generating module 120 may be configured to provide second electrical energy and deliver the second electrical energy to at least one of the charging interface 150, the power storage module 130, or the like.

The second electrical energy refers to electrical energy generated by the power generating module 120.

In some embodiments, the power generating module 120 may include at least one of a solar power generation device, a wind power generation device, or the like.

The solar power generation device may convert solar energy into electricity. The wind power generation device is capable of converting wind power into the electrical energy.

In some embodiments, the power generating module 120 may also include other devices capable of generating power, for example, at least one of a thermal generator, a hydroelectric generator, a geothermal generator, a nuclear generator, or the like.

The use of at least one of the solar power generation device and the wind power generation device for power generation has the advantage of being clean and non-polluting, and is conducive to providing a variety of power sources, so as to facilitate the subsequent selection of different types of power sources based on user's needs for charging the electrical vehicles, to realize the effect of linkage charging.

The power storage module 130 is configured to store the electrical energy.

In some embodiments, the power storage module 130 may be configured to store at least one of the first electrical energy and the second electrical energy and deliver at least one of the first electrical energy and the second electrical energy to the charging interface 150. In some embodiments, the power storage module 130 is in communication connection with the control module 160. In some embodiments, the control module 160 may charge a battery of the power storage module 130 via at least one of the power generating module 120 and the power grid charging module 110 in response to receiving a power storage instruction.

The power storage instruction refers to a control instruction for controlling the power storage module 130 to store the electrical energy. The control module 160 may obtain the power storage instruction in a plurality of ways. For example, the control module 160 may obtain the power storage instruction, or the like, by manual input. More details regarding the control module 160 and the power storage instructions may be found in the related description below.

In some embodiments, the power storage module 130 may include at least one battery. A plurality of the batteries may be connected in series and/or in parallel. In some embodiments, the plurality of the batteries may be wired into the first circuit.

In some embodiments, the power storage module 130 may include at least one of a first battery and a second battery, or the like. At least one of the first battery and the second battery may be configured to store the at least one of the first electrical energy and the second electrical energy and deliver the at least one of the first electrical energy and the second electrical energy to the charging interface 150.

In some embodiments, the first battery and the second battery may be used interchangeably. For example, the second battery may store the electrical energy while the first battery charges the electrical vehicle. When the second battery charges the electrical vehicle, the first battery may store the electrical energy.

By using the first battery and the second battery alternatively, the first battery and the second battery do not output current at the same time, and while one of them outputs power, it may store power of the other one so that the power storage module always has sufficient power storage to ensure continuity and stability of current output.

The interaction module 140 refers to a module configured to communicate and transmit information. In some embodiments, the interaction module 140 may be configured to obtain a charging request.

The charging request refers to a request to charge the electrical vehicle using the power storage module 130 from a user. In some embodiments, the charging request may include at least one of a type of a connecting end used by the electrical vehicle, a charging duration, or the like.

More details regarding the type of the connecting end may be found in the related descriptions below.

In some embodiments, the interaction module 140 may obtain the charging request in a plurality of ways, for example, by at least one of obtaining manual input, obtaining user terminal input, or the like. The user terminal refers to a terminal device used by a user that issues the charging request. In some embodiments, the user terminal may be in communication connection with the interaction module 140. In some embodiments, the user terminal may include at least one of a cell phone, a computer, or the like.

The charging interface 150 is configured to be connected with the electrical vehicle and to output the electrical energy to the electrical vehicle. In some embodiments, the charging interface 150 may include a second circuit, a connecting end, a third circuit, and a converter, or the like, and the connecting end and the third circuit are connected to the electric vehicle that sends out the charging request.

In some embodiments, the second circuit may be connected with at least one of the power grid charging module 110, the power generating module 120, the power storage module 130, or the like. In some embodiments, the charging interface 150 is electrically connected with the power grid charging module 110, the power generating module 120, the power storage module 130, or the like, and the charging interface 150 is in communication connection with the control module 160.

The second circuit refers to a circuit that transmits the electrical energy from at least one of the power grid charging module 110, the power generating module 120, and the power storage module 130 to the charging interface. In some embodiments, the second circuit may control at least one of the power grid charging module 110, the power generating module 120, and the power storage module 130 to be in communication with the converter.

More details regarding the converter may be found in the related description below.

The connecting end refers to a structure that is connected with an on-board charger of the electric vehicle. In some embodiments, the connecting end may include at least one of an alternating current (AC) charging connecting end, a direct current (DC) charging connecting end, or the like.

In some embodiments, the connecting end may include a plurality of types, such as at least one of a fast-charging connecting end, a slow-charging connecting end, a new energy connecting end, or the like.

The fast-charging connecting end refers to a connecting end in which the time required for fully charging the electrical vehicle satisfies a first condition. The first condition may include that a charging power is at least one of 16 kW, 11 kW, or the like, and the time required for fully charging is at least one of 2 hours, 3 hours, or the like.

The slow-charging connecting end refers to a connecting end in which the time required for fully charging the electrical vehicle satisfies a second condition. The second condition may include that charging power is at least one of 3 kW, 2 KW, or the like, and the time required for fully charging is at least one of 6 hours, 8 hours, or the like.

The new energy connecting end refers to a connecting end that is charged using the second electrical energy generated by the power generating module 120.

The converter refers to a structure that changes current and/or voltage. For example, the converter may convert at least one of a direct current to an alternating current, an alternating current to a direct current, a magnitude of a current, a magnitude of a voltage, or the like.

In some embodiments, the converter may be configured to regulate at least one of the first electrical energy and the second electrical energy delivered by at least one of the power grid charging module 110, the power generating module 120, the power storage module 130, or the like, to a charging current and to the third circuit.

In some embodiments, the converter may include a plurality of types. For example, at least one of a linear DC/DC converter, a switching DC/DC converter, an isolated DC/DC converter, or the like.

The charging current refers to a current that meets charging requirements of the on-board charger of the electrical vehicle, for example, at least one of 32A, 16A, 10A, or the like.

The third circuit refers to a circuit that transmits the electrical energy from the converter to the connecting end. In some embodiments, the third circuit may control the transmission of the charging current to at least one of the fast-charging connecting end, the slow-charging connecting end, the new energy connecting end, or the like, respectively.

In some embodiments, the charging interface 150 may be configured to, in response to receiving a charging instruction, take at least one of the first electrical energy and the second electrical energy delivered by at least one of the power grid charging module 110, the power generating module 120, the power storage module 130, or the like, to charge the electrical vehicle through the converter and the third circuit.

The charging instruction refers to a control instruction by which the control module 160 controls the charging interface 150 to charge the on-board charger of the electrical vehicle. In some embodiments, the charging instruction may include charging using at least one of the power grid charging module 110, the power generating module 120, the power storage module 130, or the like.

In some embodiments, the charging instruction may include the second circuit connecting the converter to at least one of the power grid charging module 110, the power generating module 120, the power storage module 130, or the like, to cause at least one of the power grid charging module 110, the power generating module 120, the power generating module 130, or the like, to deliver the electrical energy to the converter.

In some embodiments, the charging instruction may include the third circuit connecting the converter to one of the fast-charging connecting end, the slow-charging connecting end, the new energy connecting end, or the like. In some embodiments, the charging instruction may include the converter changing the current and/or voltage based on the type of the selected connecting end, correspondingly. In some embodiments, the charging instruction may control at least one of the power grid charging module 110, the power generating module 120, the power storage module 130, or the like, to turn on and/or turn off to deliver the electrical energy and/or stop delivering the electrical energy, or the like.

In some embodiments, the connecting end may correspond to the power grid charging module 110, the power generating module 120, and the power storage module 130, respectively. For example, the fast-charging connecting end may be powered by the power grid charging module 110. The slow-charging connecting end may be powered by the power storage module 130. The new energy connecting end may be powered by the power generating module 120. In some embodiments, at least two of the power grid charging module 110, the power generating module 120, and the power storage module 130 may simultaneously supply power to one of the fast-charging connecting end, the slow-charging connecting end, and the new energy connecting end.

In some embodiments, the control module 160 may determine the charging instruction in a plurality of ways. For example, the charging instruction is determined by at least one of manual input, historical data, or the like.

Figure 2:
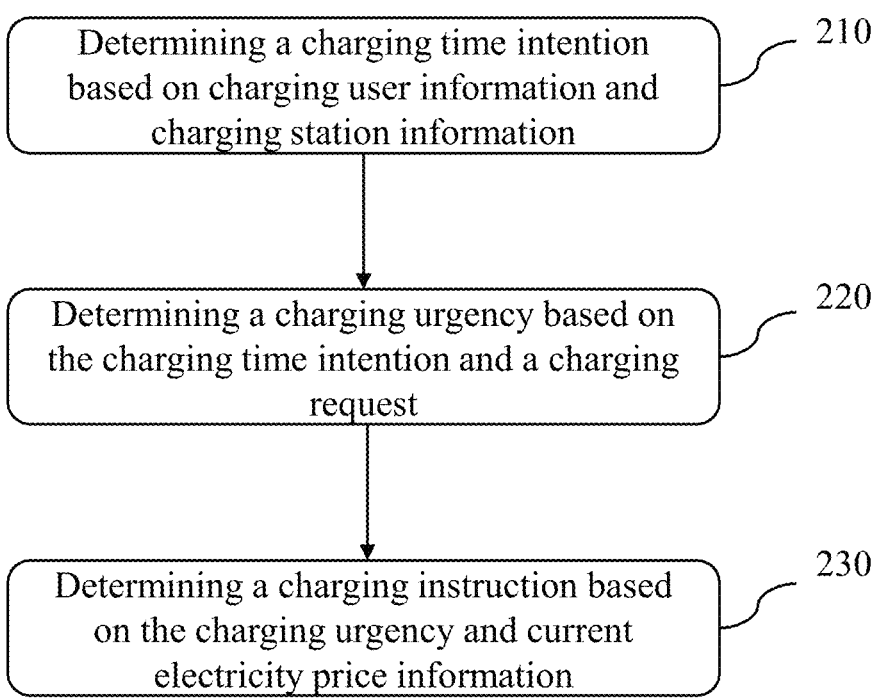
FIG. 2 is a flowchart illustrating an exemplary process for determining a charging instruction according to some embodiments of the present disclosure.

In some embodiments, the control module 160 may determine the charging instruction based on a charging urgency and current electricity price information, and more details may be found in FIG. 2 and related descriptions thereof.

The control module 160 may be configured to analyze, process, and store the data, generate control instructions based on the data, and send the control instructions to the actuator to cause the actuator to perform a corresponding action or function. For example, the control module 160 may respectively send the control instructions to the power grid charging module 110, the power generating module 120, the power storage module 130, the interaction module 140, and the charging interface 150 to cause them to perform the corresponding functions, respectively.

In some embodiments, the control module 160 may determine the power storage instruction based on power storage module information.

The power storage module information refers to information related to the power storage module. In some embodiments, the power storage module information may include at least one of an operating condition, a power condition, or the like, of at least one of the first battery and the second battery. The operating condition may include at least one of which of the first battery and the second battery is being charged, a charging time, a frequency, or the like. The power condition may include the remaining power of at least one of the first battery and the second battery, or the like.

More details regarding the power storage instruction may be found in the related description hereinabove.

In some embodiments, the control module 160 may determine the power storage instruction based on the power storage module information in a plurality of ways. For example, the control module 160 may generate the power storage instruction based on the power condition in the power storage module information. For example, when the remaining power of at least one of the first battery and the second battery is lower than a predetermined value of the remaining power, the control module 160 generates a corresponding power storage instruction for at least one of the first battery and the second battery.

The predetermined value of the remaining power refers to a predetermined value that causes the control module 160 to generate the power storage instruction. In some embodiments, the control module 160 may determine the predetermined value of the remaining power in a plurality of ways, for example, by at least one of obtaining manual input, obtaining from the historical data, or the like.

In some embodiments, the power storage instruction may include charging the power storage module 130 using at least one of the power grid charging module 110, and the power generating module 120. For example, when the power generating module 120 generate power normally, the power storage instruction may include charging the power storage module 130 using the power generating module 120. When the power generating module 120 cannot generate power normally, the power storage instruction may include charging the power storage module 130 using the power grid charging module 110.

In some embodiments, the control module 160 may, in response to obtaining the charging request, determine the charging instruction and send it to the charging interface based on the charging request. For example, after the control module 160 obtains the charging request, based on the type of the connecting end in the charging request, the charging instruction may include selecting a corresponding power source (e.g., the power grid charging module 110, the power generating module 120, the power storage module 130, or the like) to provide the electrical energy, and after conversion by the converter, delivering the converted electrical energy to the corresponding connecting end via the third circuit.

The new energy linkage charging system provided by some embodiments of the present disclosure is capable of utilizing a plurality of power sources to provide the electrical energy to charge the electrical vehicle, which enlarges the scope of applicability of the system, and can satisfy the needs of different users. The new energy linkage charging system also realizes automated control and matching, providing different charging functions according to different charging needs, which is conducive to improving the service precision of the system.

In some embodiments, the new energy linkage charging system 100 may further include a heat dissipation device.

The heat dissipation device refers to a device configured to cool down other structures. For example, an air-cooled radiator, a water-cooled radiator, an air conditioner, or the like. In some embodiments, the heat dissipation device may be connected with the power grid. The heat dissipation device may be configured to dissipate heat from at least one of the power generating module 120, the power storage module 130, and the charging interface 150.

In some embodiments, the heat dissipation device may include a plurality of distributed heat dissipation devices. The plurality of distributed heat dissipation devices may be arranged in a plurality of locations separately. For example, the plurality of distributed heat dissipation devices may be disposed on at least one of at least one connecting end, the converter, the battery, the power generating module, or the like. The plurality of distributed heat dissipation devices may perform a function of dissipating heat. The plurality of distributed heat dissipation devices may perform the function of dissipating heat simultaneously.

In some embodiments, the heat dissipation device may be in communication connection with the control module 160. The control module 160 is further configured to determine a heat dissipation parameter of the heat dissipation device.

The heat dissipation parameter refers to a parameter related to the operation of the heat dissipation device. In some embodiments, the heat dissipation parameter may include at least one of heat dissipation power, heat dissipation duration, target temperature, or the like. In some embodiments, the heat dissipation parameter may include a distributed heat dissipation parameter when the heat dissipation device uses a distributed heat dissipation device. In some embodiments, the distributed heat dissipation parameter may include a sequence of a plurality of the heat dissipation parameters.

The heat dissipation power refers to a working power of the heat dissipation device. The thermal power is positively correlated to a heat dissipation effect of the heat dissipation device.

The heat dissipation duration refers to a duration for which the heat dissipation device dissipates heat for at least one of the power generating module 120, the power storage module 130, and the charging interface 150.

The target temperature refers to a temperature that at least one of the power generating module 120, the power storage module 130, and the charging interface 150 needs to reach after the heat dissipation device dissipates heat for the power generating module 120, the power storage module 130, and the charging interface 150. After reaching the target temperature, the heat dissipation device may stop dissipating heat.

In some embodiments, the control module 160 may determine the heat dissipation parameters in a plurality of ways. For example, default heat dissipation parameters are determined as distributed heat dissipation parameters. The default heat dissipation parameter may be obtained from a manufacturer.

In some embodiments, the control module may determine heat dissipation efficacy data based on a first operation information of the converter, second operation information of the battery, a candidate heat dissipation parameter, and the current electricity price information; and determine the heat dissipation parameter based on the heat dissipation efficacy data. More details may be found in FIG. 4 and related descriptions thereof.

By utilizing the heat dissipation device to dissipate heat for structures such as the power generating module, the power storage module, and the charging interface, it is possible to prevent the structures such as the power generating module, the power storage module, and the charging interface from being overly hot, which prevents them from being utilized normally and affects the service life. Using the control module to realize automated control improves the degree of automation of the heat dissipation device. Through the automated control, it is possible to take an appropriate frequency of heat dissipation at an appropriate time, balance the power consumption and the efficiency of heat dissipation of the heat dissipation device, and reduce the cost of using the heat dissipation device, while at the same time improving work efficiency of the power generating module, the power storage module, the charging interface, and other structures, and extending their service life, thereby further reducing maintenance costs.

FIG. 2 is a flowchart illustrating an exemplary process for determining a charging instruction according to some embodiments of the present disclosure. As shown in FIG. 2, process 200 includes the following operations. In some embodiments, the process 200 may be performed by the control module 160.

In 210, a charging time intention is determined based on charging user information and charging station information.

In some embodiments, the interaction module 140 may be further configured to obtain the charging user information.

The charging user information refers to information related to a charging user. In some embodiments, the charging user information may include historical charging information, or the like.

In some embodiments, the interaction module 140 may obtain the charging user information in a plurality of ways.

For example, from historical data, or the like. The interaction module 140 may transmit the obtained charging user information to the control module 160.

The historical charging information refers to information related to charging performed by a user during a historical time period. In some embodiments, the historical charging information may include at least one of a charging time, a charging location, a historical charging duration, or the like. The charging location may include a location where a charging station is located.

The charging station information refers to information related to the charging station. For example, the location where the charging station is located, or the like. In some embodiments, the charging station information may include a region type of a region in which the charging station is located, such as an office region, a consumer region, a residential region, or the like.

In some embodiments, the control module 160 may determine the charging station information in a plurality of ways, for example, by manual input, obtaining from the historical data, or the like.

In some embodiments, the control module 160 may construct a relationship correspondence table between each charging station and the region type. The region type corresponding to the charging station is determined by querying the relationship correspondence table. In some embodiments, the control module 160 constructs the relationship correspondence table based on a specific location of the charging station. For example, the charging station located in a community corresponds to a residential region.

The charging time intention refers to a predicted need for time of the charging user, e.g., a predicted charge duration that the user may allow, or the like.

In some embodiments, the control module 160 may count the historical charging duration of the charging user for charging with charging stations in regions of the same region type for a certain historical time period and designate an average of the historical charging duration as the charging time intention of the charging user.

The certain historical time period may include a historical target time period corresponding to a time period to which the current time belongs in the historical data, a time period before and after the historical target time period, or the like.

In some embodiments, the control module 160 may divide time to obtain a plurality of time periods, e.g., dividing a day into 24 time periods, or the like.

When the charging user is charging the electric vehicle, the start or end time point for charging may not exactly match the start or end time point of the time period. Considering a deviation of the start or end time point for charging relative to the start or end time point of the time period, when calculating the average of the historical charging duration, the historical target time period corresponding to the time period to which the current time belongs and charging records of the time period before and after the historical target time period are counted, which may improve the accuracy of the data.

In 220, a charging urgency is determined based on the charging time intention and a charging request.

More details regarding the charging request may be found in FIG. 1 and related descriptions thereof.

The charging urgency refers to a level of urgency that the charging user has for charging needs. The charging urgency may include a plurality of levels.

In some embodiments, the control module 160 may determine the charging urgency in a plurality of ways. For example, the control module 160 may determine the charging urgency based on the charging time intention and the charging request by a predetermined rule.

In some embodiments, the predetermined rule may include as follows:

When an interface type selected for the charging request is not a fast-charging connecting end, the control module 160 determines that the charging urgency is low, which reflects that the charging user does not have a requirement for a fast full charging, and the urgency level is low.

When the interface type selected for the charging request is the fast-charging connecting end, if a predicted charging duration is longer than a first predetermined time, the control module 160 determines that the charging urgency is moderately low, which reflects that the charging user, although selecting fast charging, does not have a high requirement for the predicted charging duration, and the urgency level is moderately low.

When the interface type selected for the charging request is the fast-charging connecting end, if the predicted charging duration is less than a second predetermined time, the control module 160 determines that the charging urgency is moderately high, which reflects that the charging user requires charging within a limited time, the possibility of full charging is low, and there is no requirement for being fully charged, the urgency level is moderately high.

When the interface type selected for the charging request is the fast-charging connecting end, if the predicted charging duration is greater than or equal to the second predetermined time and less than or equal to the first predetermined time, the control module 160 determines that the charging urgency is advanced, which reflects that the charging user picks up the vehicle when it is fully charged or an interval is short, indicating that the user's requirement is to fully charge the vehicle as soon as possible, and thus the urgency level is the highest.

The control module 160 may set the first predetermined time and the second predetermined time in advance. In some embodiments, the first predetermined time may be greater than the second predetermined time.

In some embodiments, the control module 160 may select, from the historical data, the longest time required for the electrical vehicle to be fully charged, as the first predetermined time.

In some embodiments, the control module 160 may, from the historical data, select a plurality of times required for the electrical vehicle to be fully charged, compute an average of the plurality of times, and designate the average as the second predetermined time.

In some embodiments, the control module 160 may adjust the first predetermined time and the second predetermined time finely, based on, for example, the remaining power of the electrical vehicle and the interface type selected for the charging request, and designate the adjusted predetermined time as the first predetermined time and the second predetermined time. The remaining power of the electrical vehicle may be obtained by user input.

In some embodiments, the predetermined rule may also include other rules. The control module 160 may obtain the predetermined rule input by the user.

In 230, the charging instruction is determined based on the charging urgency and current electricity price information.

More details regarding the charging instruction may be found in other contents of the present disclosure (e.g., FIG. 1).

The current electricity price information refers to information related to a charging price in the current time period.

In some embodiments, the control module 160 may determine the current electricity price information in a plurality of ways, for example, by at least one of obtaining manual input, obtaining from the historical data, or the like.

In some embodiments, the control module 160 may determine the charging instruction by vector matching. For example, the control module 160 may construct a first standard vector library. The first standard vector library includes a plurality of first standard vectors. The control module 160 may construct a first clustering vector based on a historical charging urgency of each historical charge, historical electricity price information, and a subsequent charging module that is actually adopted corresponding to the historical electricity price information in the historical data. The control module 160 may then designate a historical charging urgency and historical electricity price information corresponding to a center of the clustering as the first standard vector.

The control module 160 may construct a first to-be-matched vector based on a current charging urgency and current electricity price information, calculate a vector similarity between the first to-be-matched vector and the first standard vector, determine an actually adopted charging module corresponding to the first standard vector with the highest similarity, and designate instruction of adopting ng the charging module for charging as the charging instruction.

The actually adopted charging module refers to at least one of the power grid charging module 110, the power generating module 120, the power storage module 130, or the like.

When determining the charging instruction, it is possible to prioritize the more urgent need of the user by considering the charging urgency. By considering the current electricity price information, it is possible to make targeted modifications to the user's needs, which may reduce the cost of charging for the charging user and enhance the user's experience.

In some embodiments, the control module 160 may be further configured to determine a future stability of the power generating module based on environmental information and power generating module information for a future time period.

The environmental information refers to information related to the environment of the region where the charging station is located. The environmental information may include at least one of a wind speed, a light intensity, or the like.

In some embodiments, the control module 160 may obtain the environmental information for the future time period in a plurality of ways, for example, by at least one of obtaining manual input, querying a weather forecast website, or the like.

In some embodiments, the power generating module information may include at least one of an energy type, a conversion efficiency, a current/voltage magnitude, or the like, required by the power generating module 120 to generate electricity. The energy type may include at least one of a light energy, a wind energy, a thermal energy, or the like.

In some embodiments, the control module 160 may determine the power generating module information in a plurality of ways, for example, by at least one of obtaining manual input, utilizing sensor detection, or the like.

The future stability refers to a stability degree of the power generation situation of the power generating module 120 in the future time period. The future stability may reflect whether there are abnormal changes in an amount of electricity generated by the power generating module 120 in the future time period. For example, the weather may change from sunny to cloudy in the future time period, and the power generating module, which utilizes light energy to generate electricity, may generate a sudden decrease in the amount of electricity.

In some embodiments, the control module 160 may determine the future stability in a plurality of ways. For example, the control module 160 may select, from the historical data, data that is the same as, or has a similarity higher than a similarity threshold with, the environmental information and the power generating module information for the future time period, calculate a mean of a historical stability corresponding to the data, and designate the mean of the historical stability as the future stability. The similarity threshold is a predetermined value.

As another example, the control module 160 may monitor a current I of the power generating module for the historical time period, calculate the historical stability based on the current I, and designate the historical stability as the future stability. The historical time period refers to a time period corresponding to the future time period in which the environmental information and the power generating module information are the same as, or have a similarity above, the similarity threshold. In some embodiments, the historical stability may be negatively correlated to a variance of the current I and positively correlated to a mean of the current I.

In some embodiments, the control module 160 may calculate the historical stability based on the current I via a first predetermined equation. For example, the first predetermined equation may include equation (1):

$$W_d = 1 \bigg/ \left(\frac{F}{P}\right). \tag{1}$$

$W_d$ denotes the historical stability, F denotes the variance of the current I, and P denotes the mean of the current I.

In some embodiments, the control module 160 may determine the future stability based on the environmental information and the power generating module information through a stability prediction model. More details regarding the stability prediction model may be found in other contents of the present disclosure (e.g., FIG. 3).

In some embodiments, the control module 160 may determine the charging instruction based on the future stability, the charging urgency, and the current electricity price information.

In some embodiments, the control module 160 may determine the charging instruction by vector matching. For example, the control module 160 may construct a second standard vector library and a second to-be-matched vector. The second standard vector library includes a plurality of second standard vectors. The control module 160 may construct a second clustering vector, based on the historical future stability, the historical charging urgency, and the historical electricity price information of each historical charge, and their corresponding subsequent charging modules that are actually adopted in the historical data. The control module 160 may then designate the historical future stability, the historical charging urgency, and the historical electricity price information corresponding to a center of the clustering as the second standard vector. The second to-be-matched vector may include the future stability, the charging urgency, and the current electricity price information.

In some embodiments, the control module 160 may, based on the second to-be-matched vector, calculate a vector similarity between the second to-be-matched vector and the second standard vector, determine a charging module that is actually adopted corresponding to the second standard vector with the highest similarity, and designate an instruction of adopting the charging module for charging as the charging instruction.

More details regarding the charging module that is actually adopted may be found in the previous description.

Determining the charging instruction takes into account the degree of future stability of power generation by the power generating module and the effect of the degree of stability of power generation by the power generating module on the power supply, which is conducive to further improving the accuracy of determining the charging instruction.

In some embodiments, the control module 160 is further configured to determine the charging instruction based on the future stability, the charging urgency, and the current electricity price information by a predetermined algorithm.

In some embodiments, the control module 160 may obtain the predetermined algorithm in a plurality of ways, e.g., by at least one of manual inputs, obtaining from the historical data, or the like.

In some embodiments, the predetermined algorithm may include a first predetermined value and a second predetermined value.

The first predetermined value and the second predetermined value are predetermined reference values that are compared to the future stability, respectively. In some embodiments, the control module 160 may obtain the first predetermined value and the second predetermined value in a plurality of ways, e.g., by obtaining at least one of manual input, obtaining from the historical data, or the like.

In some embodiments, the first predetermined value may be positively correlated to a voltage stability of a power grid. In some embodiments, the control module 160 may calculate the first predetermined value based on a second predetermined equation. For example, the second predetermined equation may include equation (2):

$$Y_1 = k \times D_w. \tag{2}$$

$Y_1$ denotes the first predetermined value, $D_w$ denotes the voltage stability, and k denotes a first coefficient, k may be a number between 0 and 1. A larger k indicates a higher requirement for the voltage stability during charging (e.g., when the charging urgency is advanced).

In some embodiments, the voltage stability may be different at different times, e.g., the voltage stability is lower at peak power usage than at flat power usage, or the like.

In some embodiments, the voltage stability may be obtained in a plurality of ways. For example, measurements are made by using instruments (e.g., electronic loads, digital voltages, or the like) that measure the voltage stability of the power grid.

In some embodiments, the second predetermined value is positively correlated to a desired voltage stability and negatively correlated to a heat dissipation efficacy ratio of the charging interface. In some embodiments, the control module 160 may calculate the second predetermined value based on a third predetermined equation. For example, the third predetermined equation may include equation (3):

$$Y_2 = (w \times Q_w)/S. \qquad (3)$$

$Y_2$ denotes the second predetermined value, $Q_w$ denotes the desired voltage stability, S denotes a heat dissipation efficacy ratio, and w denotes a first factor. w may be a number between 0 and 1, and a larger w indicates a higher requirement for the future stability while charging (e.g., when the charging urgency is advanced). In some embodiments, the desired voltage stability is the degree of stability of a desired voltage when charging the electrical vehicle. The control module 160 may determine the desired voltage stability based on a requirement of a stability degree of a voltage of the power grid when charging the electrical vehicle over a time period. For example, an average of a desired stability degree of the voltage of the power grid when charging the electrical vehicle over the time period is calculated and designated as the desired voltage stability.

The heat dissipation efficacy data refers to data related to characterizing a thermal effect of a heat dissipation device. The heat dissipation efficacy data may be represented by the heat dissipation efficacy ratio. The heat dissipation efficacy ratio refers to a ratio of a thermal cost to a thermal efficiency. The smaller the heat dissipation efficacy ratio is, the better the heat dissipation of the heat dissipation device at the same cost.

In some embodiments, the control module 160 may obtain the heat dissipation efficacy data in a plurality of ways, e.g., from a manufacturer, or the like. In some embodiments, the control module 160 may determine the heat dissipation efficacy data based on first operation information of a converter, second operation information of a battery, a candidate heat dissipation parameter, and the current electricity price information. More details may be found in FIG. 4 and related descriptions thereof.

Determining the first predetermined value based on the voltage stability takes into account the effect of the voltage stability of the power grid on charging. For example, when the voltage stability decreases during a peak power consumption period, the first predetermined value may adaptively decrease, which is conducive to improving the accuracy of determining the first predetermined value. Determining the second predetermined value based on the heat dissipation efficacy ratio improves the precision of determining the second predetermined value.

In some embodiments, the predetermined algorithm may include as follows.

When the future stability is higher than the first predetermined value, the charging instruction includes adopting the power generating module for charging. The future stability being higher than the first predetermined value may reflect the stability of the power supply of the power generating module. A low cost of the power generating module corresponds to a low electricity price. As a result, charging with the power generating module results in a stable current output at a low cost.

When the electricity price is below an electricity price threshold or the charging urgency is advanced, the charging instruction include adopting the power grid charging module for charging. In some embodiments, the control module 160 may determine the electricity price threshold in a plurality of ways, for example, by at least one of obtaining manual input, obtaining from the historical data, or the like.

When the electricity price is higher than or equal to the electricity price threshold, and the future stability is lower than or equal to the first predetermined value and higher than the second predetermined value, if the charging urgency is moderately high, the charging instruction includes adopting the power generating module for charging. If the charging urgency is moderately low or low, the charging instructions include adopting the battery for charging.

When the electricity price is above the electricity price threshold and the future stability for the future time period is below the second predetermined value, if the charging urgency is moderately high, the charging instructions include charging using the battery. If the charging urgency is moderately low or low, the charging instructions include adopting the power generating module for charging.

The first predetermined value is greater than the second predetermined value.

In some embodiments, the predetermined algorithm may also include other content. The control module 160 may obtain the predetermined algorithm input by the user.

Because of the high upfront investment in the power generating module, the return is low, and profits may only be obtained by using the power generating module more. As a result, when the power generating module generate power stably, it is prioritized to use the power generating module to supply power, thus increasing the revenue of the power generating module. The charging instruction is determined by the predetermined algorithm, which may automatically generate a corresponding charging instruction according to the charging urgency of the user to satisfy the actual needs of different users and have the advantages of fast response and high precision. Determining the charging instruction based on the first predetermined value and the second predetermined value can improve the accuracy of determining the charging instruction.

Figure 3:
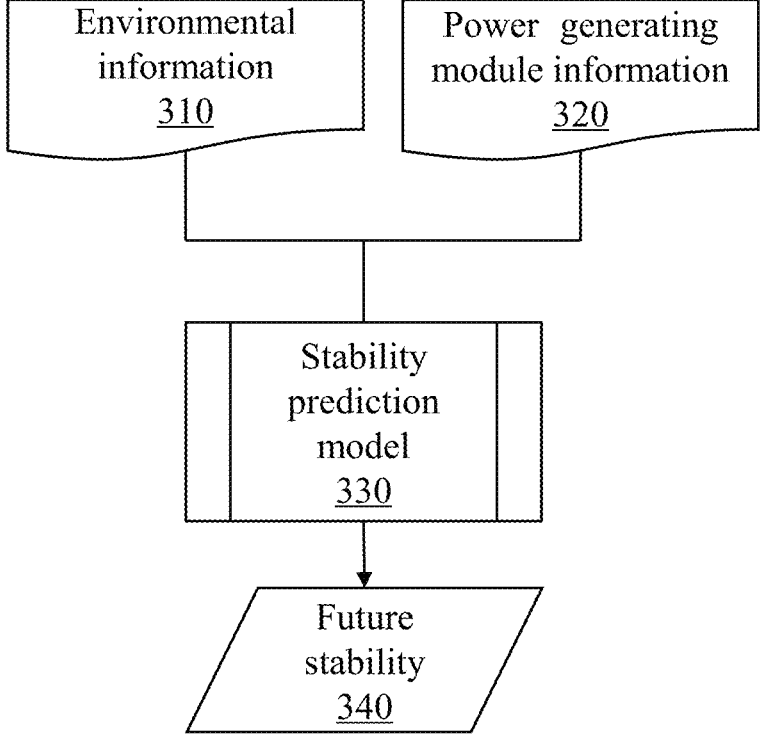
FIG. 3 is a schematic diagram illustrating an exemplary stability prediction model according to some embodiments of the present disclosure.

FIG. 3 is a schematic diagram illustrating an exemplary stability prediction model according to some embodiments of the present disclosure.

In some embodiments, the control module 160 may be further configured to determine, based on environmental information 310 and power generating module information 320, a future stability 340 via a stability prediction model 330.

The stability prediction model 330 refers to a model that is configured to determine a future stability 340. The stability prediction model 330 may be at least one of a machine learning model, e.g., a neural network (NN), a convolutional neural network (CNN), or the like.

In some embodiments, an input of the stability prediction model 330 may include the environmental information 310 and the power generating module information 320 for a future time period, and an output of the stability prediction model 330 may include the future stability 340. More details regarding the environmental information, the power generating module information, and the future stability for the future time period may be found in other contents of the present disclosure (e.g., FIG. 2).

In some embodiments, the stability prediction model may be obtained by training a plurality of first training samples with a first label in a training set.

For example, the control module may obtain the plurality of first training samples with the first label in the training set. The control module performs a plurality of rounds of iteration.

The at least one round of iteration includes the control module inputting one or more first training samples with the first label into an initial prediction model to obtain a model prediction output corresponding to the one or more first training samples. The control module calculates a value of a loss function based on substituting model prediction outputs corresponding to the one or more first training samples and first labels of the one or more first training samples into an equation of a predefined loss function. The control module inversely updates model parameters in the initial prediction model based on the value of the loss function. The model parameters may be updated in a plurality of ways. For example, the model parameters may be updated based on a gradient descent algorithm. The iteration described above is repeated, and when an end condition of the iteration is satisfied, the iteration is ended, then the trained stability prediction model is obtained.

In some embodiments, the first training sample may include sample environmental information and sample power generating module information in historical data. The first label is an actual stability corresponding to the sample environmental information and the sample power generating module information. In some embodiments, the control module determines the actual stability based on the current I by monitoring the current I of the power generating module for a time period corresponding to the first training sample. The control module designates the determined actual stability as the first label for the first training sample. Determining the actual stability based on the current I is similar to determining the historical stability based on the current I. More details may be found in FIG. 2 and related descriptions thereof.

In some embodiments, a training process for the stability prediction model includes training the initial prediction model based on the training set; obtaining a trained model based on a validation set by validating the initial prediction model; and testing the trained model based on a test set.

The trained model refers to a model obtained after training the initial prediction model in the training set and validating the validation set.

The training set refers to a dataset configured to train parameters within the initial prediction model. The validation set refers to a dataset configured to test a state of the initial prediction model and convergence situation during the training process. The validation set is typically configured to adjust hyperparameters and determine which set of the hyperparameters has the best performance based on the performance of the model on a plurality of the validation sets.

In some embodiments, the validation set may also be configured to monitor the initial prediction model for over-fitting during the training process. For example, when the performance of the validation set is stabilized, if training continues, the performance of the training set may continue to improve, but the validation set may appear to be decreasing. At this point, it may be judged that the initial prediction model is overfitting, and training may be stopped.

The test set is a dataset configured to evaluate a generalization ability of the initial prediction model. It is determined whether the trained model works properly using the test set.

In some embodiments, the training set, the validation set, and the test set include a dataset consisting of the sample environmental information and the sample power generation information for a predetermined time period drawn from the historical data. In some embodiments, the control module 160 may obtain the training set, the validation set, and the test set based on the historical data.

The predetermined time period refers to a preset time interval. The predetermined time period may be any time period that is predetermined according to the actual demand.

In some embodiments, data volumes of the training set, the validation set, and the test set constitute a first predetermined ratio without data crossover. A sample statistical difference in the training set is greater than a predetermined difference threshold, which relates to a statistical value of the historical stability.

The first predetermined ratio refers to a ratio of the data volumes of the training set, the validation set, and the test set. For example, the data volume of the training set:the data volume of the validation set:the data volume of the test set may be 8:1:1, or the like. In some embodiments, the first predetermined ratio may also include other ratios. The control module 160 may determine the first predetermined ratio in a plurality of ways, for example, by at least one of obtaining from the historical data, obtaining manual input, or the like.

Without data crossover indicates that the training set, the test set, and the validation set do not have the same data.

The sample statistical difference refers to the diversity of samples in the training set. The greater the diversity of the samples, the greater the sample statistical difference. In some embodiments, the control module 160 may calculate the sample statistical difference in a plurality of ways. For example, the sample environmental information and the sample power generating module information for each first training sample in the training set is quantified as numbers, i.e., each first training sample corresponds to a numerical vector. If the sample environmental information and the sample power generating module information are originally numbers, the quantified numbers may be equal to values of the sample environmental information and the sample power generating module information.

The control module 160 may calculate a vector distance between two of the first training samples in the training set. The vector distance may be represented in a plurality of forms, e.g., cosine distances, or the like. The control module 160 may calculate a variance of a plurality of vector distances. The greater the variance, the greater the sample statistical difference. The larger the sample statistical difference, the more robust the stability prediction model obtained by training, which prevents the stability prediction model from overfitting.

More details regarding the environmental information and the power generating module information may be found in other contents of the present disclosure (e.g., FIG. 2).

The predetermined difference threshold refers to a predetermined reference value for comparison with the sample statistical difference.

In some embodiments, the control module 160 may determine the predetermined difference threshold in a plurality of ways, for example, by at least one of obtaining manual input, obtaining from the historical data, or the like.

In some embodiments, the predetermined difference threshold may be positively correlated to a statistical value of the historical stability.

The statistical value of the historical stability refers to a statistical value of the historical stability corresponding to the power generating module in the historical data. In some embodiments, the statistical value of the historical stability may include, for example, a variance of the historical stability corresponding to the power generating module in the historical data.

In some embodiments, the control module 160 may statistically count, in the historical data, values of the historical stability corresponding to the plurality of the power generating modules, thereby calculating the variance of the historical stability corresponding to the power generating modules based on the values of the historical stability corresponding to the plurality of the power generating modules.

The larger the statistical value of the historical stability of the power generating module, the more factors affecting the power generation of the power generating module. The predetermined difference threshold may be increased. The larger the predetermined difference threshold, the larger the sample statistical difference. The stability prediction model is made to learn from more widely distributed data samples to improve accuracy of the stability prediction model. When training the model, training the initial prediction model using the training set, validating the initial prediction model using the validation set, and testing the trained model using the test set may enable a training effect of the initial prediction model to be generalized to a testing effect of the trained model, and thus generalized to the stability prediction model obtained by training, which may improve the learning efficiency and accuracy of the stability prediction model.

Predicting the future stability by the stability prediction model can further improve the efficiency and accuracy of predicting the future stability, thereby facilitating further improvement of the accuracy of determining the charging instruction when determining the charging instruction subsequently.

Figure 4:
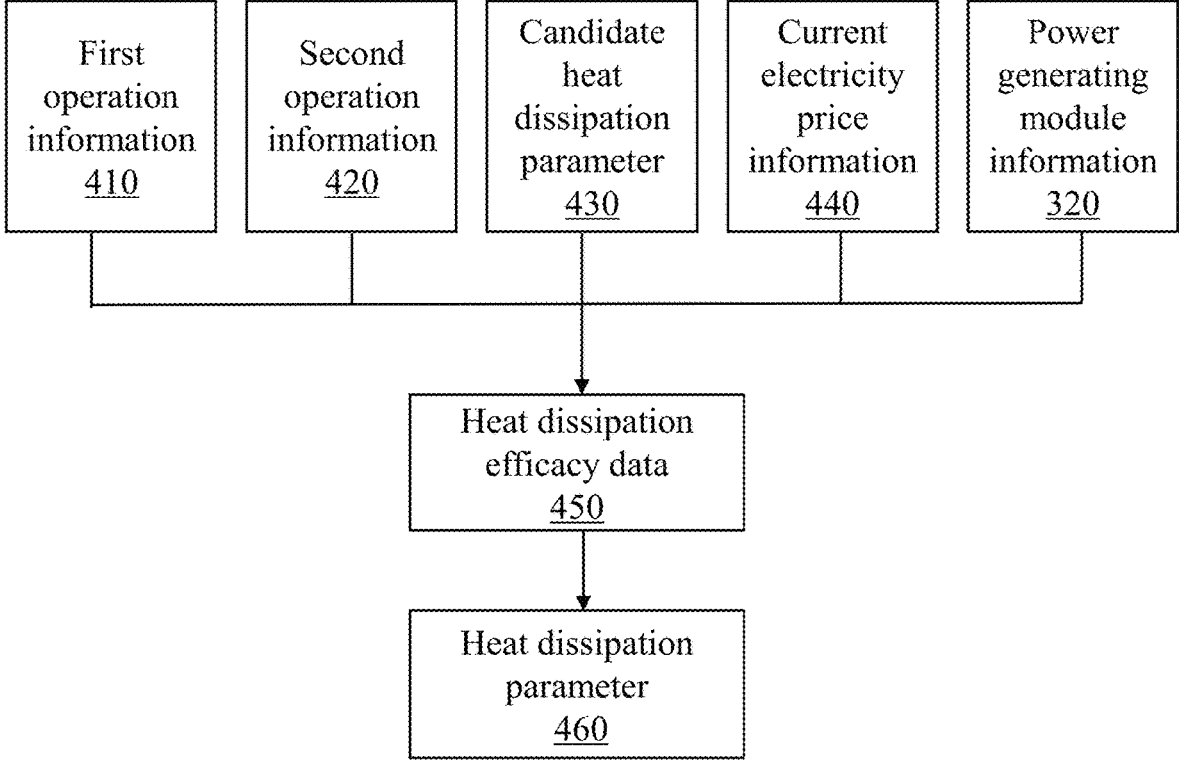
FIG. 4 is an exemplary schematic diagram illustrating determining a heat dissipation parameter according to some embodiments of the present disclosure.

FIG. 4 is an exemplary schematic diagram illustrating determining a heat dissipation parameter according to some embodiments of the present disclosure.

In some embodiments, as shown in FIG. 4, the control module may be further configured to determine heat dissipation efficacy data 450 based on a first operation information 410 of a converter, a second operation information 420 of a battery, the power generating module information 320, a candidate heat dissipation parameter 430, and current electricity price information 440; and determine a heat dissipation parameter 460 based on the heat dissipation efficacy data 450.

More details regarding the current electricity price information, the heat dissipation efficacy data, and the heat dissipation parameter may be found in other contents of the present disclosure (e.g., FIG. 1 or FIG. 2). More details regarding the power generating module information, may be found in other contents of the present disclosure (e.g., FIG. 3).

The first operation information refers to information about the operation of the converter of the charging interface. For example, the first operation information may include conversion efficiency, DC to AC conversion, AC to DC conversion, or the like.

In some embodiments, the control module may be in communication connection with the charging interface to obtain the first operation information of the converter in real time or at intervals. For example, the control module may obtain an electrical energy inputted into a second circuit of the charging interface and an amount of electricity outputted from a third circuit per unit of time, or the like, and obtain the conversion efficiency by calculating a ratio of the two.

The second operation information refers to running information of the battery. For example, the second operation information may include at least one of an operating voltage of the battery, an operating temperature zone, a capacity of the battery, a time that the battery has been used, or the like.

In some embodiments, the control module may obtain the second operation information of the battery in real time or at intervals. For example, the control module may obtain the second operation information of the battery by a relevant device (e.g., a multimeter, a temperature sensor, a high rate discharge meter, or the like.) mounted on the battery.

The candidate heat dissipation parameter refers to a series of to-be-selected heat dissipation parameters generated to determine the heat dissipation parameter.

In some embodiments, the control module may generate a plurality of sets of the candidate heat dissipation parameters in a plurality of ways. For example, the control module may determine the plurality of sets of the candidate heat dissipation parameters based on the heat dissipation parameter in historical data by random generation. As another example, the control module may generate one or more sets of the candidate heat dissipation parameters by randomly adjusting one or more heat dissipation parameters based on the heat dissipation parameter in the same historical period. The same historical period refers to the same time period in historical time, for example, 08:00-09:00, or the like.

In some embodiments, the control module may obtain the heat dissipation efficacy data in a plurality of ways based on the first operation information, the second operation information, the power generating module information, the candidate heat dissipation parameter, and the current electricity price information. For example, the control module may determine the heat dissipation efficacy data based on the first operation information, the second operation information, the power generating module information, the candidate heat dissipation parameter, and the current electricity price information by vector matching.

For example, the control module may construct a third standard vector library. The third standard vector library includes a plurality of third standard vectors. The control module 160 may build a third clustering vector based on historical first operation information, historical second operation information, historical power generating module information, a historical heat dissipation parameter, and historical electricity price information for each historical charge and their corresponding actual heat dissipation efficacy data in the historical data, and designate the historical first operation information, the historical second operation information, the historical power generating module information, the historical heat dissipation parameters, and the historical electricity price information corresponding to a center of the clustering as the third standard vector.

The control module 160 may construct a third to-be-matched vector based on the current first operation information, the second operation information, the power generating module information, the candidate heat dissipation parameter, and the current electricity price information, calculate a vector similarity between the third to-be-matched vector and the third standard vector, and designate actual heat dissipation efficacy data corresponding to the third standard vector with the highest similarity as the heat dissipation efficacy data corresponding to the candidate heat dissipation parameter.

The control device may separately determine the heat dissipation efficacy data corresponding to each set of the candidate heat dissipation parameters in the manner described above.

In some embodiments, the control module may obtain the actual heat dissipation efficacy data in a plurality of ways. For example, the control module may monitor the difference in heat before and after heat dissipation at the power generating module, the power storage module, the charging interface, or the like, as well as a total amount of power employed in heat dissipation, calculate a total electricity price based on the total amount of power and the power price information when measuring, calculate a ratio of the total electricity price to the heat difference at the power generating module, the power storage module, the charging interface, or the like, and further calculate an average value, which is designated as the actual heat dissipation efficacy data.

In some embodiments, the control module is further configured to determine the heat dissipation efficacy data based on the first operation information, the second operation information, the power generating module information, the candidate heat dissipation parameter, and the current electricity price information via an efficacy determination model.

The efficacy determination model refers to a model for determining the heat dissipation efficacy data. In some embodiments, the efficacy determination model is a machine learning model. For example, the efficacy determination model may include one or a combination of convolutional neural network (CNN), recurrent neural network (RNN), deep neural network (DNN), or the like.

In some embodiments, an input of the efficacy determination model may include the first operation information, the second operation information, the power generating module information, the candidate heat dissipation parameter, and the current electricity price information, and an output of the efficacy determination model may include the heat dissipation efficacy data.

In some embodiments, the input of the efficacy determination model also includes an ambient temperature. The ambient temperature refers to a temperature of the environment in which the heat dissipation device is located. In some embodiments, the control module may obtain the ambient temperature in a plurality of ways. For example, the control module may obtain the ambient temperature by the measurement of a temperature sensor.

In some embodiments of the present disclosure, the accuracy of the heat dissipation efficacy data determined by the efficacy determination model can be improved by designating the ambient temperature as the input of the efficacy determination model, taking full account of the effect of environmental factors on the heat dissipation device.

In some embodiments, the efficacy determination model may be obtained by training in various feasible ways based on a plurality of second training samples with a second label. For example, the parameters may be updated based on a gradient descent algorithm. Descriptions regarding training the efficacy determination model is similar to training the stability prediction model, which may be found in FIG. 3.

In some embodiments, the second training samples may include a plurality of sets of training samples, each of which includes at least the first operation information of the sample converter, the second operation information of the sample battery, sample power generating module information, a sample candidate heat dissipation parameter, and the sample current electricity price information. The second training samples may be obtained based on historical data.

In some embodiments, the second label may include the actual heat dissipation efficacy data corresponding to the second training sample. The second label may be obtained via the control module. Descriptions regarding the control module obtaining the actual heat dissipation efficacy data may be found in the related descriptions hereabove.

In some embodiments, when the input of the efficacy determination model also includes the ambient temperature, the second training sample may also include a sample ambient temperature.

In some embodiments of the present disclosure, through the efficacy determination model, the heat dissipation efficacy data may be quickly and accurately determined, reducing unnecessary waste of time, saving costs, and facilitating the subsequent selection of the heat dissipation device with a better dissipation effect.

In some embodiments, the control module may determine the heat dissipation parameter in a plurality of ways based on a plurality of sets of the heat dissipation efficacy data corresponding to the plurality of sets of the candidate heat dissipation parameters. The smaller the heat dissipation efficacy data, the better the heat dissipation effect of the heat dissipation device at the same cost. For example, the control module may sort the plurality of sets of the heat dissipation efficacy data and select the candidate heat dissipation parameter corresponding to the smallest of the heat dissipation efficacy data therein as the heat dissipation parameter.

In some embodiments of the present disclosure, determining heat dissipation efficacy data corresponding to different candidate heat dissipation parameters, which is conducive to selecting the heat dissipation parameter that has the best heat dissipation effect at the same cost. Meanwhile, adopting an appropriate heat dissipation parameter at an appropriate time may balance the power consumption of the heat dissipation device and the heat dissipation of the device, reduce the cost while improving the efficiency of the device, prolong the life of the device, and thereby further reduce maintenance costs.

One or more embodiments of the present disclosure provide a non-transitory computer-readable storage medium storing computer instructions. When a computer reads the computer instructions in the storage medium, the computer executes the new energy linkage charging system.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A new energy linkage charging system, comprising a power grid charging module, a power generating module, a power storage module, an interaction module, a charging interface, and a control module, wherein:

the power grid charging module includes a first circuit connected with a power grid, and the power grid charging module is configured to deliver first electrical energy provided by the power grid to at least one of the charging interface and the power storage module;

the power generating module is configured to provide second electrical energy and deliver the second electrical energy to at least one of the charging interface and the power storage module;

the power storage module is configured to store at least one of the first electrical energy and the second electrical energy and deliver the at least one of first electrical energy and the second electrical energy to the charging interface, wherein the power storage module is in communication connection with the control module; and in response to receiving a power storage instruction, charge a battery of the power storage module via at least one of the power generating module and the power grid charging module;

the interaction module is in communication connection with the control module, and the interaction module is configured to obtain a charging request and a charging user information, wherein the charging user information includes historical charging information;

the charging interface includes a second circuit, a connecting end, a third circuit, and a converter, the connecting end and the third circuit connected to an electric vehicle that sends out the charging request; wherein the second circuit is connected with at least one of the power grid charging module, the power generating module, and the power storage module; the converter is configured to regulate at least one of the first electrical energy and the second electrical energy delivered by at least one of the power grid charging module, the power generating module, and the power storage module to a charging current and deliver the charging current to the third circuit; the charging interface is in circuit connection with the power grid charging module, the power generating module, and the power storage module, and the charging interface is in communication connection with the control module;

the charging interface is configured to transfer at least one of the first electrical energy and the second electrical energy delivered by at least one of the power grid charging module, the power generating module, and the power storage module to charge the electric vehicle through the converter and the third circuit in response to receiving a charging instruction; and the control module is configured to:

determine the power storage instruction based on power storage module information;

in response to obtaining the charging request, determine the charging instruction and send the charging instruction to the charging interface based on the charging request, including:

determine a charging time intention based on the charging user information and charging station information;

determine a charging urgency based on the charging time intention and the charging request;

determine, via a stability prediction model, a future stability of the power generating module based on environmental information and power generating module information for a future time period, wherein the environmental information includes at least one of a wind speed and a light intensity, the stability prediction model is a machine learning model, a process of training the stability prediction model includes:

training an initial prediction model based on a training set, and obtaining a trained model by validating the initial prediction model based on a validation set;

testing the trained model based on a test set, wherein the training set, the validation set, and the test set include a data set consisting of sample environmental information and sample power generation information for a predetermined time period drawn from historical data, wherein:

data volumes of the training set, the validation set, and the test set constitute a first predetermined ratio with no data crossover;

a sample statistical difference in the training set is greater than a predetermined difference threshold, and the predetermined difference threshold relates to a statistical value of a historical stability;

determine the charging instruction based on the charging urgency, the future stability and current electricity price information; wherein the charging instruction includes charging by employing at least one of the power grid charging module, the power generating module, and the power storage module; and send the charging instruction to the charging interface.

2. The system of claim 1, wherein the control module is further configured to:

determine the charging instruction by a predetermined algorithm based on the future stability, the charging urgency, and the current electricity price information.

3. The system of claim 2, wherein the predetermined algorithm includes a first predetermined value and a second predetermined value, the first predetermined value relates to a voltage stability of the power grid, and the second predetermined value relates to a heat dissipation efficacy data of the charging interface.

4. The system of claim 1, further comprising a heat dissipation device, wherein the heat dissipation device is connected with the power grid, and the heat dissipation device is in communication connection with the control module;

the heat dissipation device is configured to dissipate heat for at least one of the power generating module, the power storage module, and the charging interface; and the control module is further configured to determine a heat dissipation parameter of the heat dissipation device.

5. The system of claim 4, wherein the control module is further configured to:

determine heat dissipation efficacy data based on first operation information of the converter, second operation information of the battery, the power generating module information, a candidate heat dissipation parameter, and the current electricity price information; and determine the heat dissipation parameter based on the heat dissipation efficacy data.

6. The system of claim 5, wherein the control module is further configured to:

determine the heat dissipation efficacy data based on the first operation information, the second operation information, the power generating module information, the candidate heat dissipation parameter, and the current electricity price information via an efficacy determination model, wherein the efficacy determination model is a machine learning model.

7. The system of claim 6, wherein an input of the efficacy determination model further includes an ambient temperature.

8. The system of claim 1, wherein the power generating module includes at least one of a solar power generation device and a wind power generation device.

9. The system of claim 1, wherein the power storage module includes at least one of a first battery and a second battery, wherein the first battery and/or the second battery are configured to store the first electrical energy and/or the second electrical energy and transport the first electrical energy and/or the second electrical energy to the charging interface.

10. The system of claim 9, wherein the power storage module information includes at least one of working conditions and power levels of the first battery and/or the second battery.

11. A non-transitory computer-readable storage medium storing computer instructions, wherein when a computer reads the computer instructions in the storage medium, the computer performs the system of claim 1.

\* \* \* \* \*